Feb. 22, 1955   C. G. KRONMILLER   2,702,844
THERMOSTAT
Filed May 2, 1952
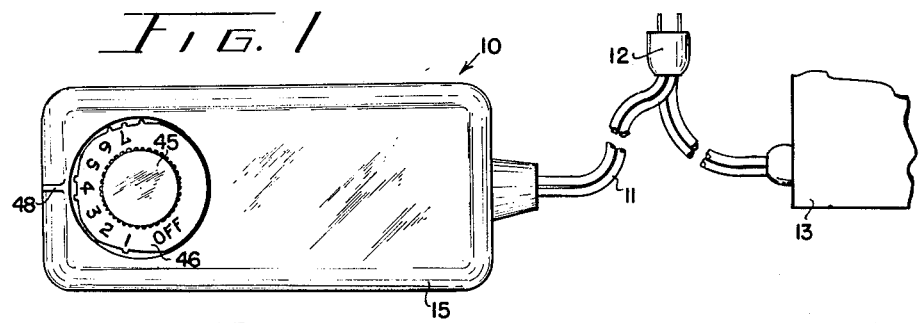
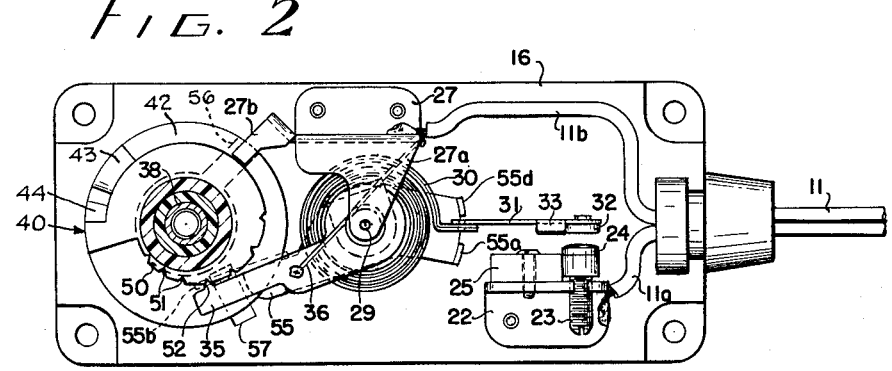
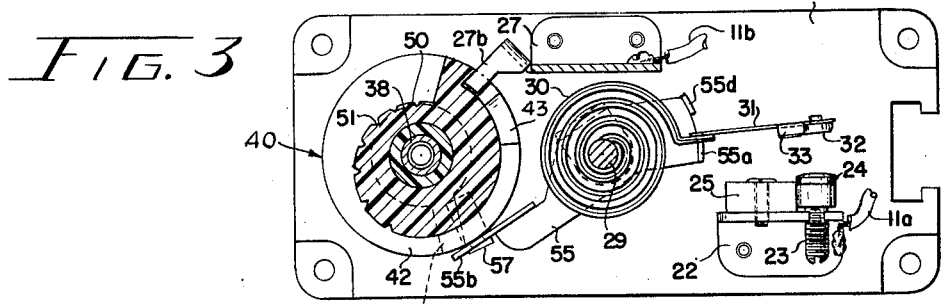
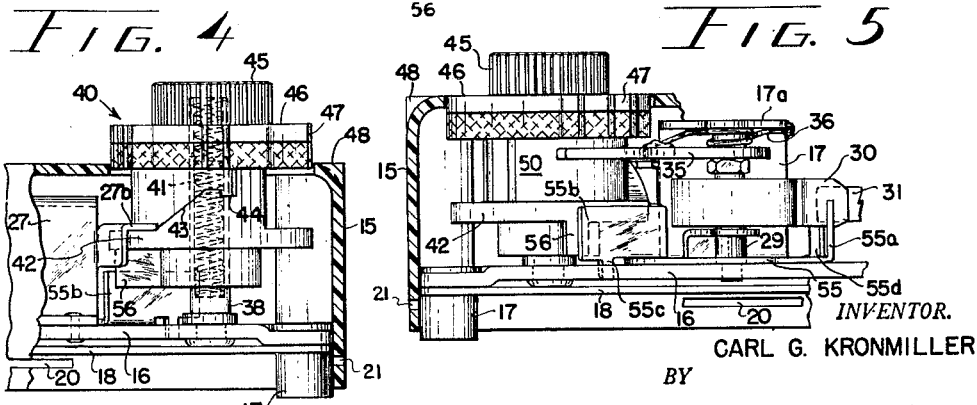
INVENTOR.
CARL G. KRONMILLER
BY
George H Fisher
ATTORNEY United States Patent Office 2,702,844
Patented Feb. 22, 1955

2,702,844

THERMOSTAT

Carl G. Kronmiller, Edina, Minn., assignor to Minneapolis-Honeywell Regulator Company, Minneapolis, Minn., a corporation of Delaware Application May 2, 1952, Serial No. 285,765

13 Claims. (Cl. 200—139)

This invention is directed to a thermostatic control for electric blankets adapted to supply current to a blanket at a rate depending on the temperature of room air, and has for its object the provision of an improved device of this type. The rate of heat supply is adjustable manually in accordance with individual preference and to take into account the amount of heat insulation over the heated blanket, i. e., additional blankets or other bed coverings.

In the type of control in question current passes through the heating element at only one rate, but the effect of a variable rate is attained by cycling the thermostatic switch. For example if the switch contacts are closed for one minute out of every two minutes, the effective rate will be half the continuously energized rate.

The control device is used in a system wherein a thermostat, subjected to room air temperature, controls the current supplied to a resistance wire in a blanket. The bimetal element, the contacts and the resistance wire are all in series. The bimetal itself acts as a resistance and is heated by the flow of current. Hence, the bimetal responds to both room temperature and to current flow in much the same way as the resistance wire in the blanket. At any room temperature within the range in which the control will be expected to function, and with the thermostat suitably adjusted, the contacts will remain closed until the current passing through the bimetal raises its temperature sufficiently to break the circuit. The bimetal will then cool to reclose the circuit in a time depending on the difference between bimetal temperature and room temperature. The switch operates with a snap action and hence a temperature differential is required to operate it between closed and open positions. As soon as the switch is closed current will again flow through the bimetal and it will reopen in a time depending on the switch operating differential and the difference between bimetal temperature and room air temperature. Hence, for any one setting of the thermostat there will be a relatively high room temperature above which the blanket is not heated at all, and a low room temperature below which the contacts are continuously closed. At intermediate room temperatures the contacts will cycle open and closed and will be closed for a percentage of time necessary to supply heat at the proper rate for the room temperature existing at the time. The thermostat control point may be adjusted to suit individual preference and to allow for additional blankets, etc.

The invention has to do with the thermostat adjusting mechanism which includes a knob that indicates a plurality of operative settings together with an "off" position. The various "on" settings are indicated by numbers on a dial and, to facilitate adjustment in the dark, are further indicated by a spring detent for each setting and by configuration of the periphery of the dial. The "off" position is characterized by suitable lettering on the dial, by axial retraction of the dial to a position flush with the instrument casing and by concurrent disappearance of a visually contrasting band on the periphery of the dial.

Figure 1 is a plan view of the blanket thermostat connected electrically to a plug and a blanket.

Figure 2 is a plan view of the device with the cover removed and with the cam assembly sectioned below the dial.

Figure 3 is a view similar to Figure 2 but showing the parts in the "off" position, and sectioned below the cam follower.

Figure 4 is a fragmentary elevation showing the cam assembly set at position "1."

Figure 5 is a fragmentary elevation showing the device in "off" position.

As seen in Figure 1, the thermostat shown generally at 10, is connected by a two-wire cord 11 to a wall plug 12 and to an electric blanket 13. One of the wires of the cord is not electrically connected to the plug but continues through the plug to the blanket. Thus, the blanket and the thermostat are connected in series.

The thermostat 10 is mounted in a case comprising a cover 15 and a base 16. The base 16 is held within the cover by screws (not shown) which extend through rubber feet 17, an insulating plate 18, and the base 16, to engage bosses located in the corners of the cover. As seen in Figures 4 and 5 the cover 15 is also provided with slots 20 in its lateral surfaces below the insulating plate 18 to enable the thermostat to be strapped to a bedpost or the like. A slot 21 in one end of the cover may be used in conjunction with a suitable supporting strip to permit the thermostat to be suspended in a vertical position.

As seen in Figure 2 the cord 11 is divided within the thermostat case and one of the wires 11a is connected to a bracket 22 which is suitably secured to the base 16. This bracket is threaded to receive a stationary contact screw 23 which permits adjustment of a stationary contact 24 with respect to a permanent magnet 25 which is also carried by the bracket 22. The other wire 11b is connected to a bracket 27 which is suitably secured to the base 16. This bracket has a portion 27a that extends in parallel relation to the base 16 but spaced therefrom. A post 29 is pivoted at one end in the bracket portion 27a and at its other end in the base 16 and serves as a pivotal support for a spiral bimetal element 30. An armature 31 is attached to the outer end of the bimetal element and carries a movable contact 32 adapted to engage the stationary contact 24. A pair of ears 33 extend laterally from the armature 31 to lie in close proximity to the permanent magnet 25 when the contacts are closed. The bimetal element 30 together with the contacts, the permanent magnet and the armature comprise a thermostatic switch electrically connected between the wires 11a and 11b.

As seen in Figure 2, a cam follower 35 is also secured to the post 29 which carries the bimetal element 30, and it will be seen that the angular position of the cam follower 35 will determine the temperature at which the switch contacts will be opened and closed. A spring wire 36 attached at one end to the bracket 27, is looped around the post 29, and has its other end secured to the cam follower 35. The wire 36 assures a good electrical connection between the bracket 27 and the bimetal 30 and also biases the cam follower 35 in a clockwise direction as seen in Figure 2.

As best seen in Figure 4, a post 38 is secured to the base 16 and extends upwardly therefrom parallel to the post 29 which pivotally supports the bimetal element. An adjusting member generally indicated at 40 is both pivotally and axially movable on the post 38. The post 38 is tubular throughout most of its length to receive a spring 41 which biases the member 40 in an upwardly direction. The axial position of the member 40 is determined by an extension 27b of the bracket 27 which, throughout the greater portion of the possible angular movement of the member 40, engages the upper surface of a ledge 42 on the member 40 to determine the uppermost position of the member 40. If the member 40 is rotated in a clockwise direction beyond the position shown in Figure 4 the bracket extension 27b will engage a helical cam surface 43 to force the member 40 downwardly against the action of the spring 41. A notch 44 is provided to engage the bracket extension 27b to retain the member 40 in its retracted position and prevent accidental displacement from this position. In order to again turn the member 40 in a counter-clockwise direction it is necessary to depress it slightly to disengage the bracket extension from the notch 44.

The upper portion of the member 40 comprises a knob 45 and a dial 46. Adjacent the periphery of the dial 45, the member 40 is provided with a generally cylindrical portion 47 which extends through a circular opening in the top of the cover 15. A raised indicator 48 is provided at one end of the cover 15 to serve as an index for the indicia provided on the dial 46. As seen in Figure 1, the cylindrical portion 47 is modified to provide a surface that may be identified by the sense of touch, a single ridge being provided opposite the numeral 1, a double ridge being provided opposite the numeral 4, and a triple ridge being provided opposite the numeral 7. These ridges provide a means by which the setting of the dial may be ascertained at night without the necessity of turning on a light.

Intermediate the generally cylindrical portion 47 and the ledge 42, the member 40 is provided with a spiral cam surface 50 which engages the cam follower 35 to determine the control point of the thermostatic switch. The cam surface 50 is provided with a plurality of shallow notches 51 which engage a projection 52 on the end of the cam follower 35 to facilitate selection of the desired control point without reading the numerals on the dial. The notches are disposed on the cam surface to provide a detent at each position of the member 40 visually indicated by a numeral. The cam follower 35 is maintained in engagement with the cam surface 50 by the spring 36.

As seen in Figure 3, a "positive off" linkage is provided to prevent closure of the contacts regardless of temperature when the dial is set at the off position. A lever 55 is freely pivoted on the post 29 and has a portion 55a bent upwardly and adapted to engage the outer end of the bimetal element 30. The other end of the lever 55 is bent upwardly at 55b to provide a surface that is engaged by a radially extending portion 56 which terminates in a surface coextensive with the periphery of the ledge 42 when the member 40 is in the off position. It will be noted that lever portion 55b is disposed underneath the ledge 42 when the parts are in the position shown in Figure 2, but the radially extending portion 56 engages and moves the lever portion 55b outwardly as the member 40 is rotated to off position so that it will clear the periphery of the ledge 42 in its downward movement. Hence, when the member 40 is moved to the off position it will be impossible for the bimetal element 30 to close the contacts. The lever 55 is also provided with an extension 55c which extends into a notch 57 in the base 16. When this extension 55c engages the outer edge of the notch 57, further counter-clockwise movement of the lever 55 is prevented and a portion 55d which extends upwardly from the other end of the lever 55 is in a position to engage the outer end of the bimetal element 30 to prevent movement of the armature 31 and contact 32 into engagement with the wire 11b or the inner surface of the cover 15.

The lower portion of the generally cylindrical periphery 47 of the dial 46 is colored to contrast with the color of the cover 15. For example, the cover 15 may be a neutral color such as light gray and the lower part of the periphery of the dial may be colored a bright orange. Hence, in all positions in which current may be supplied to the blanket an orange band will show at the edge of the dial indicating that the blanket may be energized. This not only is an aid in preventing waste of electricity during the daytime but also serves as a warning that articles should not be piled on the bed with the consequent possibility of overheating. The orange band has been shown in the drawing as extending only part way up the cylindrical periphery of the dial, but it may, of course, extend over this entire area. Figure 5 illustrates the position of the dial when in the off position, and it will be noted that the orange band has been retracted below the adjacent surface of the cover, and the dial is flush with the cover.

While the cam surface has been shown as having notches to provide a detent at each of the numbered dial positions it is obvious that a separate detent mechanism could be provided that did not involve the cam follower. Numerous other changes could be made without departing from the invention as set forth in the appended claims.

I claim as my invention:

1. A control device comprising, a support, a cam member carried on said support for both pivotal and axial movement with respect thereto, a thermostat on said support, a spiral cam surface on said cam member, a cam follower interconnecting said thermostat and said spiral surface so that the angularly adjusted position of said cam member determines the control point of said thermostat, a dial on a surface of said cam member substantially normal to its rotational axis, said support having a portion disposed adjacent the periphery of said dial and an index cooperating with indicia on said dial, a helical surface on said cam member adapted to engage a portion of said support to retract said dial axially with respect to the portion of said support adjacent said dial on rotation of said dial to a predetermined angular relation to said support.

2. A control device comprising, a support, an adjusting member carried on said support for both pivotal and axial movement with respect thereto, a knob on said adjusting member, a condition responsive control element on said support, a connection between said adjusting member and said element to cause pivotal movement of said member to adjust the control point of said element, and linkage means acting between said support and said member for causing axial displacement of said knob on rotation thereof to a predetermined position.

3. A control device comprising, a support, an adjusting member carried on said support for both pivotal and axial movement with respect thereto, a knob on said adjusting member, a condition responsive control element on said support, a connection between said adjusting member and said element to cause pivotal movement of said member to adjust the control point of said element, and linkage means acting between said support and said member to determine the axial position of said knob on said support in accordance with the angular position thereof.

4. A control device comprising, a case, an adjusting member carried in said case for both pivotal and axial movement with respect thereto, a dial on a surface of said member normal to the pivotal axis thereof and adapted in one axial position of said member to be substantially in the plane of an outer surface of said case, a bimetal element adjustably carried in said case, a switch actuated by said bimetal element, means interconnecting said adjusting member and said bimetal element to determine the temperature at which said bimetal actuates said switch in accordance with the angularly adjusted position of said member, and means on said case cooperating with said member in one angularly adjusted position to move said member to said one axial position.

5. A control device comprising, a case, an adjusting member carried in said case for both pivotal and axial movement with respect thereto, a dial surface on a portion of said member that extends through an opening in said case, a thermostatic switch in said case, means interconnecting said member and said switch to adjust the control point of said switch to a different value for each of a plurality of angularly adjusted positions of said member, and means on said case cooperating with said member to axially position said dial surface substantially flush with an adjacent outer surface portion on said case when in one of the angularly adjusted positions, and to position said dial surface beyond said surface portion of said case when in the remaining angularly adjusted positions.

6. A control device comprising, a case, an adjusting member carried in said case for both pivotal and axial movement with respect thereto, a dial surface on a portion of said member that extends through an opening in said case, a thermostatic switch in said case, means interconnecting said member and said switch to adjust the control point of said switch to a different value for each of a plurality of angularly adjusted positions of said member, a separate linkage interconnecting said member and said thermostatic switch to prevent closure of said switch when said member is in one of its angularly adjusted positions and to permit closure of said switch in the remaining angularly adjusted positions, and means on said case cooperating with said member to axially position said dial surface substantially flush with an adjacent outer surface portion of said case when said member is in said one of the angularly adjusted positions, and to position said dial surface beyond the adjacent surface portion of said case when in the remaining angularly adjusted positions.

7. A control device comprising, a case, an adjusting member carried in said case for both pivotal and axial movement with respect thereto, a dial on a portion of said member that extends through an opening in said case, said dial having an off marking and a plurality of other angularly spaced indicia indicating various control point settings, a bimetal element adjustably carried in said case, a switch adapted to be actuated by said element, means interconnecting said member and said element to adjust the latter in accordance with the angularly adjusted position of the former, and means on said case cooperating with said member to move said member axially as it is moved to the off position to position said dial substantially flush with an adjacent outer surface portion of said case.

8. A control device comprising, a case, an adjusting member carried in said case for both pivotal and axial movement with respect thereto, a dial on a portion of said member that extends through an opening in said case, said dial having an off marking and a plurality of other angularly spaced indicia indicating various control point settings, a bimetal element adjustably carried in said case, a switch adapted to be actuated by said element, means interconnecting said member and said element to adjust the latter in accordance with the angularly adjusted position of the former, a separate linkage interconnecting said member and said switch to prevent closure of said switch when said dial is in the off position and to permit closure of said switch in the remaining angularly adjusted positions, and means on said case cooperating with said member to move said member axially as it is moved to the off position to position said dial substantially flush with an adjacent outer surface portion of said case.

9. A control device comprising, a case, an adjusting member carried in said case for both pivotal and axial movement with respect thereto, said member having a generally cylindrical portion that extends through an opening in said case and a dial on the end of said cylindrical portion, said dial having an off marking and a plurality of other angularly spaced indicia indicating various control point settings, a bimetal element adjustably carried in said case, a switch adapted to be actuated by said element, means interconnecting said member and said element to adjust the latter in accordance with the angularly adjusted position of the former, a separate linkage interconnecting said member and said switch to prevent closure of said switch when said dial is in the off position and to permit closure of said switch in the remaining angularly adjusted positions, and means on said case cooperating with said member to move said member axially as it is moved to the off position to position said dial substantially flush with an adjacent outer surface portion of said case, said dial and the adjacent surface portion of said case being of one color and a portion of the cylindrical portion of said adjusting member that is visible beyond said case in certain angularly adjusted positions thereof being of a contrasting color.

10. A control device comprising, a case, an adjusting member carried in said case for both pivotal and axial movement with respect thereto, said member having a generally cylindrical portion that extends through an opening in said case, and manually positionable means on said member beyond said cylindrical portion and outside said case, a condition responsive control element in said case, a connection between said adjusting member and said element to adjust the control point of said element in accordance with the angularly adjusted position of said member, and a linkage between said support and said member to position said cylindrical portion of said member below the adjacent surface of said case in one angularly adjusted position thereof and to position a portion of said cylindrical portion beyond the adjacent surface of said case in other angularly adjusted positions, the adjacent surface portion of said case being of one color and at least a part of the cylindrical surface of said member that is visible beyond said case in certain angularly adjusted positions being of a contrasting color.

11. A control device comprising, a case, an adjusting member carried in said case for both pivotal and axial movement with respect thereto, said member having a generally cylindrical portion that extends through an opening in said case, and manually positionable means on said member beyond said cylindrical portion and outside said case, a condition responsive control element in said case, a connection between said adjusting member and said element to adjust the control point of said element in accordance with the angularly adjusted position of said member, and a linkage between said support and said member to position said cylindrical portion of said member below the adjacent surface of said case in one angularly adjusted position thereof and to position a portion of said cylindrical portion beyond the adjacent surface of said case in other angularly adjusted positions, the periphery of said cylindrical portion having thereon successive groups of manually detectable formations indicative of the control point setting of said condition responsive element.

12. A thermostat comprising, a base, a cam member mounted on said base for both pivotal and axial movement with respect thereto, a spiral surface on said cam member, a cam follower pivoted on said base and having a portion engaging said spiral surface, a bimetal element carried by said cam follower, a switch actuated by said element, a helical surface on said cam member, and a bracket on said base engaging said helical surface to cause movement of said cam member toward said base on rotation thereof through a predetermined angular range.

13. A control device comprising, a support, an adjusting member carried on said support for both pivotal and axial movement with respect thereto, a thermostat on said support, a connection between said member and said thermostat to adjust the control point of said thermostat on rotation of said member, cooperating indices on said support and said member visually indicating the setting of said thermostat in accordance with the angularly adjusted position of said member, said indices including an indication of an off position, means on said support cooperating with said member causing said member to move axially as said member is rotated to off position, and detent means acting on said member to indicate angular positions of said member corresponding to positions indicated by said visual indices.

References Cited in the file of this patent

UNITED STATES PATENTS

| | | |
|---|---|---|
| 2,249,259 | Shaw | July 15, 1941 |
| 2,499,679 | Pianta | Mar. 7, 1950 |
| 2,504,381 | Bordelon | Apr. 18, 1950 |
| 2,508,504 | Esmond | May 23, 1950 |